(12) United States Patent
Sha

(10) Patent No.: US 8,241,705 B2
(45) Date of Patent: Aug. 14, 2012

(54) PROCESS FOR PRODUCING POLYURETHANE COATED GLOVES

(76) Inventor: Xiaolin Sha, Shanghai (CN)

( * ) Notice: Subject to any disclaimer, the term of this patent is extended or adjusted under 35 U.S.C. 154(b) by 652 days.

(21) Appl. No.: 12/418,254

(22) Filed: Apr. 3, 2009

(65) Prior Publication Data

US 2010/0247778 A1    Sep. 30, 2010

(30) Foreign Application Priority Data

| Mar. 30, 2009 | (CN) | .......................... 2009 1 0048520 |
| Mar. 30, 2009 | (CN) | .......................... 2009 1 0048521 |
| Mar. 30, 2009 | (CN) | .......................... 2009 1 0048522 |

(51) Int. Cl.
*B05D 3/10* (2006.01)

(52) U.S. Cl. ........ 427/337; 427/340; 427/341; 427/342; 427/353; 427/354

(58) Field of Classification Search .......................... None
See application file for complete search history.

(56) References Cited

U.S. PATENT DOCUMENTS

| 3,000,757 A | * | 9/1961 | Johnston et al. ................ 442/63 |
| 3,582,393 A | * | 6/1971 | Shikada .......................... 427/246 |
| 3,669,792 A | * | 6/1972 | Mitsukawa et al. ........... 156/249 |
| 3,690,911 A | * | 9/1972 | Endo et al. ...................... 427/464 |
| 3,714,307 A | * | 1/1973 | Shikada ............................ 264/49 |
| 3,729,536 A | * | 4/1973 | Warwicker ........................ 264/41 |
| 3,772,059 A | * | 11/1973 | Shikada .......................... 427/246 |
| 4,157,414 A | * | 6/1979 | Smith ............................. 442/237 |
| 6,451,963 B1 | * | 9/2002 | Langel et al. ................. 528/480 |
| 2001/0018095 A1 | * | 8/2001 | Shlenker et al. .............. 427/337 |
| 2010/0050319 A1 | * | 3/2010 | Fujihana et al. ................ 2/161.1 |

FOREIGN PATENT DOCUMENTS

WO    WO2008/029703    *    3/2008

* cited by examiner

*Primary Examiner* — Erma Cameron

(57) ABSTRACT

A process for producing a polyurethane coated glove includes steps of: coating a knitted glove with a solvent, wherein the solvent is prepared by a polyurethane resin and a component selected from the group consisting of N-methyl pyrrolidone (NMP), dimethylacetamide (DMAC), and dimethyl sulfoxide (DMSO), wherein the component participates in synthesizing the polyurethane resin; treating the knitted glove with water bath; drying the knitted glove under 100~110° C., for 50~60 minutes; and recycling the component in the solvent from the water after treating with water bath by vacuum decompression.

1 Claim, No Drawings

PROCESS FOR PRODUCING POLYURETHANE COATED GLOVES

BACKGROUND OF THE PRESENT INVENTION

1. Field of Invention

The present invention relates to a process for producing polyurethane coated gloves, and more particularly to a process utilizing a safe polyurethane resin that does not use dimethylfomamide (DMF) as solvent.

2. Description of Related Arts

The polyurethane coated gloves ordinarily have knit liner and are coated with polyurethane resin, so have a thin coated resin layer and feels comfortable when wearing. Besides, the gloves are oil-proofing, wearproof, and low-cost. Therefore, they become an important product in the world safety glove market. And the production and sale of the gloves keeps continuous increasing in recent years.

To produce the safety gloves, the prior art uses dimethylfomamide (DMF) as solvent. However, DMF has high toxicity, if the safety gloves have the residue of DMF, the wearer's skin will be stimulated. What's more, using DMF as solvent will hurt the operators' health during production. Due to the foregoing drawbacks, the EU asserts that the products using DMF as solvent, including the gloves, are forbidden to use from April, 2009. The decision will greatly affect the production and export of glove factories.

Furthermore, DMF hurts the operators' health during the recycling process. On the other hand, only a part of the DMF can be recycled, and the remaining not only causes environmental pollution, but also increases production cost.

SUMMARY OF THE PRESENT INVENTION

An object of the present invention is to provide a process for producing a polyurethane coated glove, which utilizes a safe polyurethane resin as solvent to take the place of dimethylfomamide (DMF), so as to avoid stimulating the wearers' skin, and protect the operators' health during production. The process is mature, stable, and has good economic efficiency.

Another object of the present invention is to provide a process for producing a polyurethane coated glove, which utilizes a nontoxic component selected from the group consisting of N-methyl pyrrolidone (NMP), dimethylacetamide (DMAC) and dimethyl sulfoxide (DMSO), to prepare a solvent to produce the polyurethane coated glove, and reduces the high viscosity of the solvent prepared for coating on the polyurethane coated glove. The process ensures quality of the polyurethane coated glove and has high economic efficiency, and is stable and reliable.

Another object of the present invention is to provide a process for producing a polyurethane coated glove, which recycles solvent efficiently by vacuum decompression after producing, so as to reduce production cost and pollution emission. Besides, the recycling process is also safe to the operators' health.

Another object of the present invention is to provide a safe solvent for producing a polyurethane coated glove, which is used to take the place of toxic dimethylfomamide (DMF), so as to avoid stimulating the wearers' skin, and protect the operators' health during production.

Another object of the present invention is to provide a polyurethane coated glove, which is made by a safe solvent instead of toxic dimethylfomamide (DMF), so as to avoid stimulating the wearers' skin, and protect the operators' health during production.

Accordingly, in order to accomplish the above objects, the present invention provides a process for producing a polyurethane coated glove, comprising:

coating a knitted glove with a solvent, wherein the solvent is prepared by a polyurethane resin and a component selected from the group consisting of N-methyl pyrrolidone (NMP), dimethylacetamide (DMAC), and dimethyl sulfoxide (DMSO), wherein the component participates in synthesizing the polyurethane resin;

treating the knitted glove with water bath;

drying the knitted glove under 100~110° C., for 50~60 minutes; and recycling the component in the solvent from the water after treating with water bath by vacuum decompression.

These and other objectives, features, and advantages of the present invention will become apparent from the following detailed description and the appended claims.

DETAILED DESCRIPTION OF THE PREFERRED EMBODIMENT

A process for producing a polyurethane coated glove according to a preferred embodiment of the present invention is illustrated, comprising:

coating a knitted glove with a solvent, wherein the solvent is prepared by a polyurethane resin and a component selected from the group consisting of N-methyl pyrrolidone (NMP), dimethylacetamide (DMAC), and dimethyl sulfoxide (DMSO), wherein the component participates in synthesizing the polyurethane resin; and treating the knitted glove with water bath.

Particularly, the polyurethane resin is synthesized with the component participating. The polyurethane resin synthesized can not be applied to produce the polyurethane coated glove directly because of high viscosity, but must be diluted to increase the fluidity thereof. On the other hand, the solvent should be coated on the knitted glove effectively, so as to ensure a quality of the polyurethane coated glove. By plenty of experiments, the present invention utilizes the component selected from the group consisting of NMP, DMAC, and DMSO to synthesize the polyurethane resin, and then dilutes the polyurethane resin with the component to obtain the solvent. The present invention also provides an optimum ratio range thereof.

Particularly, in the solvent, a ratio of the polyurethane resin to the NMP is preferably embodied as 1:1.3~1:1.8, and a viscosity of the solvent is preferably embodied as 500~600 poise. Controlling the viscosity of the solvent helps to take the knitted glove out of the solvent, and ensures a good coating effect thereof. Therefore as an adhesion of the solvent is improved, a burden of recycling is reduced.

Particularly, in the solvent, a ratio of the polyurethane resin to the DMAC is preferably embodied as 1:1.3~1:1.9, and a viscosity of the solvent is preferably embodied as 500~600 poise. Controlling the viscosity of the solvent helps to take the knitted glove out of the solvent, and ensures a good coating effect thereof. Therefore as an adhesion of the solvent is improved, a burden of recycling is reduced.

Particularly, in the solvent, a ratio of the polyurethane resin to the DMSO is preferably embodied as 1:1.4~1:1.9, and a viscosity of the solvent is preferably embodied as 500~600 poise. Controlling the viscosity of the solvent helps to take the knitted glove out of the solvent, and ensures a good coating effect thereof. Therefore as an adhesion of the solvent is improved, a burden of recycling is reduced.

The knitted glove is preferably made of nylon or polyester yarn. Particularly, coating the knitted glove comprises: dipping the knitted glove into the solvent for 10~60 seconds, and flushing the knitted glove for 1~10 minutes. Because the solvent has a high viscosity, comparing with the prior art using DMF, the present invention extends a time of flushing the knitted glove, so as to increase the quality of the polyurethane coated glove and an economic efficiency of the process.

An object of the water bath is to cure a resin layer on the knitted glove, displace the solvent remaining on the knitted glove, and clean the knitted glove. Particularly, the knitted glove is treated with the water bath in three sinks, wherein the first sink has a water temperature of 30~35° C., each of the second and the third sinks has a water temperature of 50~55° C.

The process according to the present invention is simple. And the component selected from the group consisting of NMP, DMAC, and DMSO utilized to prepare the solvent is safe and healthy, so that it will not hurt the health of wearers or operators during production. Meanwhile, by repeatedly verifying, the process according to the present invention is stable and reliable, and provides product of good quality. The process is applicable widely.

The process further comprises:
drying the knitted glove under 100~110° C., for 50~60 minutes, after treating with water bath.

The component has slightly stimulation to human skin, but no absorption effect. After using the component to synthesize the polyurethane resin and prepare the solvent, the process according to the present invention treats the knitted glove with water bath and dries the knitted glove over and over again during producing the polyurethane coated glove. As a result, the polyurethane coated glove produced has no residue of the component in substance, therefore has no stimulation or corrosion to the human skin. However, the solvent has high viscosity, so a preparing ratio should be adjusted, and a temperature of dipping should be controlled, so as to adjust the viscosity of the solvent to produce the polyurethane coated glove. Particularly, because of the high viscosity of the solvent, the preparing ratio is increased to 5~10% higher than the prior art using DMF.

The process further comprises:
recycling the component in the solvent from the water after treating with water bath by vacuum decompression.

A recycling ratio determines the economic efficiency of the process. Solvant that is not recycled is wasted, and causes environmental pollution after emission. In addition, when the solvent has a high boiling point, recycling the solvent will consume a great deal of energy, and the solvent may react to produce impurity, which increases production cost, and is not environmentally friendly. Particularly, the process recycles the solvent by vacuum decompression, so as to reduce the boiling point of the solvent, ensure the quality of the solvent recycled, and increase the recycling security.

The present invention utilizes the component selected from the group consisting of NMP, DMAC, and DMSO to produce the polyurethane coated glove. The component is nontoxic in substance, so has low pollution to the environment. Especially after recycling, emission is further reduced, so as to protect the environment and reduce production cost.

NMP has properties of low toxicity, high boiling point, and strong solvency, and is non-flammable, biodegradable, recyclable, and safe, and therefore is applied widely in petrochemical industry, pesticide, medicine, and electrical material. However, there is no reports about that NMP is used in producing the polyurethane coated glove.

DMAC has properties of high thermal stability, good solvency, hydrolytic resistance, low corrosion, and little toxicity, and is applied in medicine, heat resistant synthetic fiber, plastic film and other organic synthesis as solvent. However, there is no reports about that DMAC is used in producing the polyurethane coated glove.

It is worth mentioning that, when the component is DMSO, a solidification point of the solvent is 18~19° C. The solvent solidifies below the solidification point. Therefore, a temperature of the solvent must be above 20° C. during preparing the solvent and producing the polyurethane coated glove. The process according to the present invention adopts a container to keep the temperature of the solvent, and adds heating and insulating device during preparing the solvent and producing the polyurethane coated glove, so as to make sure that the solvent will not be solidified.

Particularly, the present invention further comprises: keeping a temperature of the solvent above 20° C.

An example of the present invention is illustrated below, comprising the steps of:
1. mixing a polyurethane resin and a component selected from the group consisting of NMP, DMAC, and DMSO in the ratio of 1:1.6 to obtain a solvent, then placing the solvent for 4 hours, so as to make sure that the solvent has a viscosity of 500~600 poise;
2. utilizing a knitted glove made of nylon or polyester yarn as a carrier;
3. covering the knitted glove on a hand model for dipping into the solvent for 20~30 s, and flushing the knitted glove with the solvent for 5 minutes to coat the solvent on the knitted glove;
4. after coating with the solvent, treating the knitted glove in three or four water sinks, wherein the first water sink has a water temperature of 30~35° C., and each of the second and the third sinks has a water temperature of 50~55° C.;
5. after treating with water, placing the knitted glove into an oven for 50~60 minutes, wherein a temperature of the oven is 100~110° C.;
6. taking off the knitted glove from the hand model;
7. checking, packing, and storing the knitted glove; and
8. after treating the knitted glove with water, passing the water in the water sinks through a recycling device to recycling the component in the solvent.

One skilled in the art will understand that the embodiment of the present invention as described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A process for producing a polyurethane coated glove, comprising steps of:
(a) coating a knitted glove with a solvent, wherein the solvent is prepared by a polyurethane resin and a component of dimethyl sulfoxide; and
(b) treating the knitted glove with water bath,
wherein step (a) comprises: (a.1) dipping the knitted glove into the solvent for 10~60s, and (a.2) flushing the knitted glove for 1~10 minutes with water,
wherein the knitted glove is treated with the water bath in three sinks, wherein the first sink has a water temperature of 30~35° C., each of the second and the third sinks has a water temperature of 50~55° C.
the process further comprising: after step (b), drying the knitted glove under 100~110° C., for 50~60 minutes,
the process further comprising: after step (b), recycling the component in the solvent from the water by vacuum decompression,
wherein a ratio of the polyurethane resin to the dimethyl sulfoxide is 1:1.4~1:1.9, and a viscosity of the solvent is 500~600 poises, the process further comprising: keeping a temperature of the solvent above 20° C.

* * * * *